Feb. 2, 1926.
C. C. FARMER
1,571,192
FLUID PRESSURE BRAKE
Filed March 20, 1925
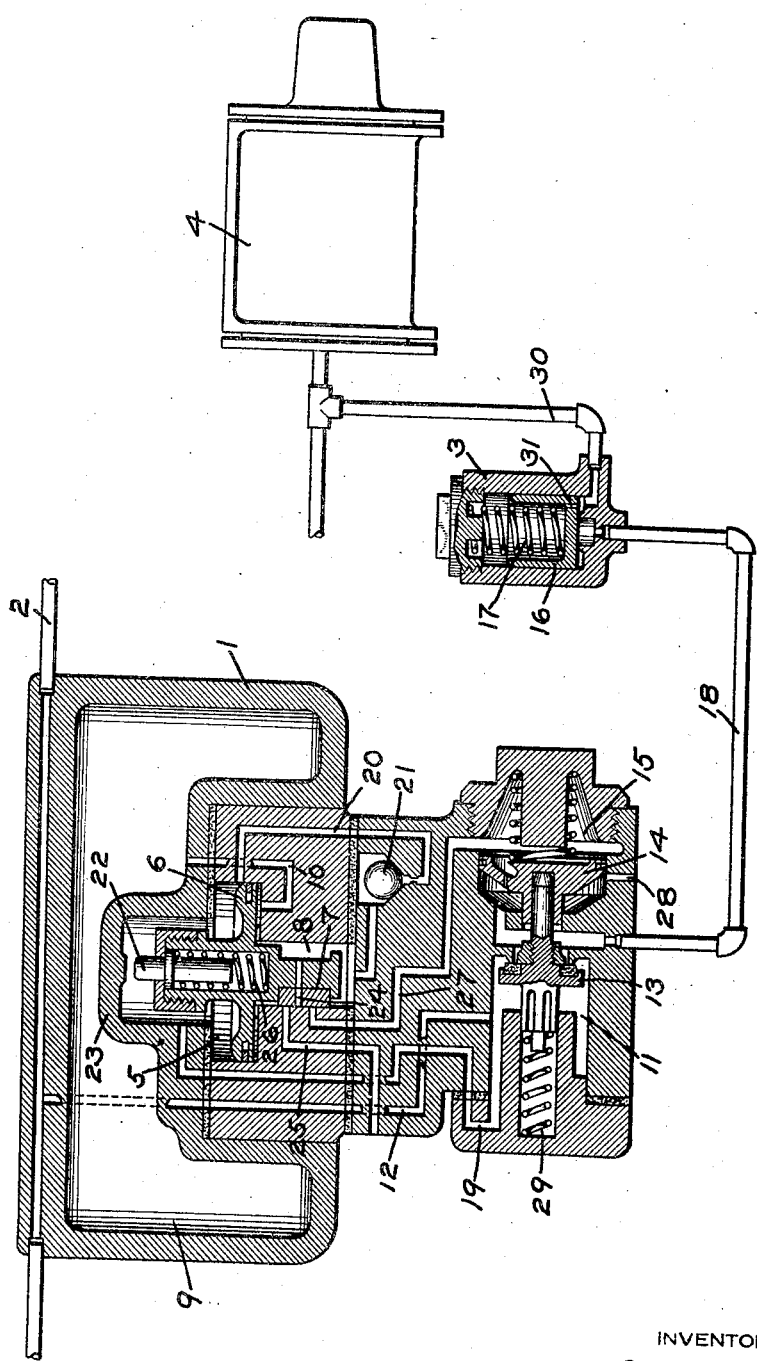
INVENTOR
CLYDE C. FARMER
BY Wm. H. Cady
ATTORNEY Patented Feb. 2, 1926.

1,571,192

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 20, 1925. Serial No. 16,886.

*To all whom it may concern:*

Be it known that I, CLYDE C. FARMER, a citizen of the United States, residing at Pittsburgh, in the county of Allegheny and State of Pennsylvania, have invented new and useful Improvements in Fluid-Pressure Brakes, of which the following is a specification.

This invention relates to fluid pressure brakes and has for its principal object to provide improved means for securing an emergency application of the brakes.

In the accompanying drawing, the single figure is a diagrammatic view, partly in section, of a brake equipment embodying my invention.

As shown in the drawing, the equipment may comprise a brake pipe vent valve device 1 connected to the brake pipe 2 and having a quick action portion, which is connected through a check valve 3 to a brake cylinder 4.

The vent valve device may comprise a casing in which is formed a piston chamber 5 containing a piston 6, which is adapted to operate a slide valve 7 contained in a valve chamber 8. Formed in the piston chamber cap is a quick action chamber 9, which is connected by a passage 10 to the valve chamber 8. The casing also has a chamber 11 connected by a passage 12 to the brake pipe 2 and containing a vent valve 13, which is adapted to be operated by a piston 14 contained in piston chamber 15.

The check valve 3 may comprise a valve piston 16, subject on one side to the pressure of a spring 17 and on the outer seated area of the other side to the pressure of fluid in the brake cylinder and on the inner seated area to pressure of fluid in a pipe 18, which is connected to a chamber intermediate the valve 13 and piston 14 of the vent valve device 1.

In operation, fluid under pressure from the brake pipe 2 flows through passage 12 to chamber 11, thence through passage 19 to piston chamber 5, forcing piston 6 to its innermost position. Fluid from piston chamber 5 flows through passage 20 past ball check 21 to valve chamber 8, thence through passage 10 to quick action chamber 9.

When a gradual reduction of pressure in the brake pipe 2 is made during a service application of the brakes, the pressure in piston chamber 5 is correspondingly reduced. The reduction of pressure in piston chamber 5 causes the piston 6 to move outwardly, until the stop 22 engages abutment 23. The slide valve 7 is shifted by the movement of piston 6 so that port 24 in said slide valve will register with an atmospheric exhaust passage 25, thereby reducing the pressure in valve chamber 8 and in quick action chamber 9 until the pressure in valve chamber 8 is reduced to a degree slightly less than the reduced pressure in piston chamber 5, when piston 6 and consequently slide valve 7 will be shifted to their innermost positions.

When the pressure in brake pipe 2 is suddenly reduced, in making an emergency application of the brakes, the pressure in piston chamber 5 is correspondingly reduced, causing piston 6 to move outwardly with such force that when stop 22 engages the abutment 23 said stop will compress spring 26, the piston 6 moving to its outermost position.

In moving to its outermost position, the piston 6 shifts the slide valve 7 to a position uncovering passage 27, leading from the slide valve seat to quick action piston chamber 15, so that fluid under pressure is supplied from valve chamber 8 and quick action chamber 9 to the face of quick action piston 14. The fluid under pressure acting on piston 14 forces said piston inwardly, unseating the valve 13.

The unseating of valve 13 permits fluid under pressure from chamber 11 and the brake pipe 2 to flow past said unseated valve and through pipe 18 to check valve 3, raising the valve piston 16 against the pressure exerted by spring 17. Fluid from the brake pipe 2 then flows through pipe 30 to the brake cylinder 4. Fluid will continue to flow from chamber 11 to the brake cylinder 4 until equalization of pressures on opposite sides of valve piston 16 has taken place through restricted port 31, when spring 17 will seat said valve piston, cutting off further flow to the brake cylinder.

As the piston 14 moves inwardly, an atmospheric port 28 is connected to piston chamber 15, which permits fluid from said piston chamber and the quick action chamber 9 to pass to atmosphere. For this reason, the piston 14 will be maintained in its innermost position and the valve 13 held unseated, only until the pressure of fluid in piston chamber 15 and quick action chamber 9 has been sufficiently reduced, through port 28, to allow the spring 29 to seat the valve 13 and return piston 14 to its outermost position.

In view of the fact that any fluid which may be in the brake cylinder, due to a previous service application, has equalized on opposite sides of the valve 16 through the restricted port 31, if the pressure of fluid vented from chamber 11 and the brake pipe 2 slightly exceeds the pressure in the brake cylinder, a flow of fluid from the brake pipe 2 to the brake cylinder in an emergency application of the brakes will be obtained, regardless of the previous service application.

The check valve 3 is located in pipe 18 at some distance from the vent valve 13, so that the section of pipe 18 between the vent valve device and the check valve device provides a sufficient volume, in itself, to ensure that the brake pipe pressure will be so reduced by flow to the pipe 18, as to cause the desired quick serial venting of the brake pipe. The fact that a service application of the brakes has previously been made will not interfere with securing quick serial action, since pipe 18 is cut off from the brake cylinder by a check valve 16, and since any leakage into pipe 18 will escape around the stem of the piston 14 to the atmospheric port 28, so that atmospheric pressure normally exists in pipe 18.

By means of the above described construction, the brake pipe vent valve device may be utilized to vent fluid from the brake pipe to the brake cylinder in an emergency application of the brakes, so as to effect a rapid build up of pressure in the brake cylinder, while at the same time, quick serial action is assured at all times, regardless of previous service applications of the brakes.

Having now described my invention, what I claim as new and desire to secure by Letters Patent, is:—

1. In a fluid pressure brake, the combination with a brake pipe and a brake cylinder, of a vent valve device operated upon a sudden reduction in brake pipe pressure for venting fluid from the brake pipe to a pipe connected with the brake cylinder, and a check valve in said pipe at a point remote from the vent valve device.

2. In a fluid pressure brake, the combination with a brake pipe and a brake cylinder, of a vent valve device operated upon a sudden reduction in brake pipe pressure for venting fluid from the brake pipe only to a pipe connected with the brake cylinder, and a check valve in said pipe at a point remote from the vent valve device, for controlling communication from said vent valve device to the brake cylinder.

3. In a fluid pressure brake, the combination with a brake pipe and a brake cylinder, of a vent valve device operated upon a sudden reduction in brake pipe pressure for venting fluid from the brake pipe to a pipe connected with the brake cylinder, and a check valve subject on opposite sides to brake cylinder pressure and located in said pipe at a point remote from the vent valve device.

4. In a fluid pressure brake, the combination with a brake pipe and a brake cylinder, of a vent valve device operated upon a sudden reduction in brake pipe pressure for venting fluid from the brake pipe to a pipe connected with the brake cylinder, and a check valve subject on one side to brake cylinder pressure and the pressure of a spring and on the opposite side to brake cylinder pressure and the pressure in said pipe for controlling communication from said vent valve device to the brake cylinder.

5. In a fluid pressure brake, the combination with a brake pipe and a brake cylinder, of a vent valve device operated upon a sudden reduction in brake pipe pressure for venting fluid from the brake pipe to a pipe connected with the brake cylinder, a check valve in said pipe at a point remote from the vent valve device, and means for normally maintaining the section of pipe between the vent valve device and the check valve at atmospheric pressure.

6. In a fluid pressure brake, the combination with a brake pipe, of a quick action valve device comprising a valve for venting fluid from the brake pipe, and a piston operated by fluid under pressure for actuating said valve, the movement of said piston to open said valve being adapted to open an atmospheric vent port to the fluid pressure side of said piston.

7. In a fluid pressure brake, the combination with a brake pipe and a brake cylinder, of a vent valve device operated upon a sudden reduction in brake pipe pressure for venting fluid from the brake pipe to a pipe connected with the brake cylinder, and a valve in said pipe at a point remote from said vent valve device for preventing flow of fluid from the brake cylinder to the section of pipe between said valve and the vent valve device, said valve being operated when the pressure of fluid vented from the brake pipe exceeds the brake cylinder pressure to permit flow from the brake pipe to the brake cylinder.

8. In a fluid pressure brake, the combination with a brake pipe and a brake cylinder, of a vent valve device operated upon a sudden reduction in brake pipe pressure for venting fluid from the brake pipe to a pipe connected with the brake cylinder, and valve means in said pipe at a point remote from said vent valve device to prevent flow of fluid from the brake cylinder to the section of pipe between said valve means and said vent valve device but adapted to permit flow from said section of pipe to the brake cylinder, said section of pipe providing a volume chamber normally at atmospheric pressure into which fluid is vented from the brake pipe by operation of the vent valve device.

In testimony whereof I have hereunto set my hand.

CLYDE C. FARMER.